(12) United States Patent
Woerner et al.

(10) Patent No.: US 11,663,511 B2
(45) Date of Patent: May 30, 2023

(54) ITERATIVE QUANTUM AMPLITUDE ESTIMATION

(71) Applicant: International Business Machines Corporation, Armonk, NY (US)

(72) Inventors: Stefan Woerner, Zurich (CH); Christa Zoufal, Zurich (CH); Dimitry Grinko, Geneva (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 426 days.

(21) Appl. No.: 16/866,108

(22) Filed: May 4, 2020

(65) Prior Publication Data

US 2021/0342728 A1 Nov. 4, 2021

(51) Int. Cl.
| | | |
|---|---|---|
| *G06F 15/00* | (2006.01) | |
| *G06F 15/08* | (2006.01) | |
| *G06N 10/00* | (2022.01) | |
| *G06F 17/18* | (2006.01) | |
| *G06N 10/60* | (2022.01) | |

(52) U.S. Cl.
CPC ............. *G06N 10/00* (2019.01); *G06F 17/18* (2013.01); *G06N 10/60* (2022.01)

(58) Field of Classification Search
CPC ......... G06N 10/00; G06N 10/60; G06F 17/18
See application file for complete search history.

(56) References Cited

U.S. PATENT DOCUMENTS

| | | |
|---|---|---|
| 2007/0025432 A1 | 2/2007 | Ozcan et al. |
| 2019/0258696 A1 | 8/2019 | Burchard |
| 2019/0378208 A1 | 12/2019 | Woerner et al. |

OTHER PUBLICATIONS

Mosca, Counting by quantum eigenvalue estimation, Apr. 2000, Theoretical computer Science, 264, pp. 139-153.*
Suzuki et al. Amplitude estimation without phase estimation, May 29, 2019, Quantum Information Processin19:75, pp. 1-17.*
Grinko et al., "Iterative Quantum Amplitude Estimation," postproarXiv: 1912.05559v1 [quant-ph], Dec. 11, 2019, 10 pages.
Suzuki et al., "Amplitude estimation without phase estimation," arXiv: 1904.10246 [quant-ph], Jan. 27, 2020, 13 pages.
Woerner et al., "Quantum Risk Analysis," arXiv: 1806.06893 [quant-ph], Jun. 18, 2018, 12 pages.

(Continued)

*Primary Examiner* — Samir W Rizk
(74) *Attorney, Agent, or Firm* — Amin, Turocy & Watson, LLP

(57) ABSTRACT

Systems, computer-implemented methods, and computer program products to facilitate iterative quantum amplitude estimation are provided. According to an embodiment, a system can comprise a memory that stores computer executable components and a processor that executes the computer executable components stored in the memory. The computer executable components can comprise an iterative quantum amplitude estimation component that increases a multiplier value of a confidence interval in an estimation problem to a defined value that positions the confidence interval in a defined plane of a defined circle. The computer executable components can further comprise a measurement component that captures a quantum state measurement of a qubit in a quantum circuit based on the defined value.

20 Claims, 10 Drawing Sheets

(56) References Cited

OTHER PUBLICATIONS

Wie, "Simpler Quantum Counting," arXiv:1907.08119 [quant-ph], Oct. 2019, 17 pages.
Aaronson et al., "Quantum Approximate Counting, Simplified," arXiv:1908.10846 [quant-ph], Sep. 9, 2019, 13 pages.
Mell et al., "The NIST Definition of Cloud Computing," Recommendations of the National Institute of Standards and Technology, NIST Special Publication 800-145, Sep. 2011, 7 pages.

\* cited by examiner

Algorithm 200: Iterative Quantum Amplitude Estimation

1 Function IQAE($\epsilon$, $\alpha$, $N_{shots}$):
2      $i = 0$ // initialize iteration count
3      $k_i = 0$ // initialize power of $Q$
4      $up_i = $ True // keeps track of the half-plane
5      $[\theta_l, \theta_u] = [0, \pi/2]$ // initialize conf. interval
6      $T = \lceil \log_2(\pi/8\epsilon) \rceil$ // max. number of rounds
7
8      while $\theta_u - \theta_l > 2\epsilon$ do
9          $i = i + 1$
10          $k_i, up_i = $ FindNextK($k_{i-1}, \theta_l, \theta_u, up_{i-1}$)
11          approximate $a_i = \mathbb{P}[|1\rangle]$ for the last qubit of $Q^{k_i}\mathcal{A}|0\rangle_n|0\rangle$ by measuring $N_{shots}$ times
12          if $k_i = k_{i-1}$ then
13              combine the results of all iterations $j \leq i$ with $k_j = k_i$ into a single results, effectively increasing the number of shots
14          construct the $(1-\alpha)/T$ confidence interval $[a_i^{min}, a_i^{max}]$ for $a_i$ based on Chernoff method or Clopper-Pearson method based on shots
15          set $K_i = 4k_i + 2$
16          calculate the confidence interval $[\theta_i^{min}, \theta_i^{max}]$ for $\{K_i \theta_a\}_{\text{mod } 2\pi}$ from $[a_i^{min}, a_i^{max}]$ and boolean flag $up_i$ by inverting $a = (1 - \cos(K_i \theta))/2$
17          $\theta_l = \frac{\lfloor K_i \theta_l \rfloor_{\text{mod } 2\pi} + \theta_i^{min}}{K_i}$
18          $\theta_u = \frac{\lfloor K_i \theta_u \rfloor_{\text{mod } 2\pi} + \theta_i^{max}}{K_i}$
19
20      $[a_l, a_u] = [\sin^2(\theta_l), \sin^2(\theta_u)]$
21
22      return $[a_l, a_u]$

FIG. 2

Algorithm 300: Procedure for finding $k_{i+1}$

```
1  Function FindNextK($k_i, \theta_l, \theta_u, \text{up}_i, r = 2, L_{\max} = \pi/8$):
2      $K_i = 4k_i + 2$  // current $\theta$-factor
3      $\theta_i^{\min} = K_i \theta_l$  // lower bound for scaled $\theta$
4      $\theta_i^{\max} = K_i \theta_u$  // upper bound for scaled $\theta$
5      if $\lceil \frac{L_{\max}}{\epsilon} \rceil \leq \lfloor \frac{\pi}{\theta_u - \theta_l} \rfloor$ then
6       |   $K_{\max} = \lfloor \frac{\pi}{\theta_u - \theta_l} \rfloor$
7      else
           // "no overshooting" condition
8       |   $K_{\max} = \lceil \frac{L_{\max}}{\epsilon} \rceil + 3$
9       |   $r = 1$
       // set an upper bound for $\theta$-factor
10     $K = K_{\max} - (K_{\max} - 2) \bmod 4$  // largest
           potential candidate of the form $4k + 2$
11
12     while $K \geq r K_i$ do
13         $q = K / K_i$  // factor to scale $[\theta_i^{\min}, \theta_i^{\max}]$
14         if $\{q \cdot \theta_i^{\max}\}_{\bmod 2\pi} \leq \pi$ and $\{q \cdot \theta_i^{\min}\}_{\bmod 2\pi} \leq \pi$
               then
               // $[\theta_{i+1}^{\min}, \theta_{i+1}^{\max}]$ is in upper half-plane
15          |   $K_{i+1} = K$
16          |   $\text{up}_{i+1} = \text{True}$
17          |   $k_{i+1} = (K_{i+1} - 2)/4$
18          |   return $(k_{i+1}, \text{up}_{i+1})$
19         if $\{q \cdot \theta_i^{\max}\}_{\bmod 2\pi} \geq \pi$ and $\{q \cdot \theta_i^{\min}\}_{\bmod 2\pi} \geq \pi$
               then
               // $[\theta_{i+1}^{\min}, \theta_{i+1}^{\max}]$ is in lower half-plane
20          |   $K_{i+1} = K$
21          |   $\text{up}_{i+1} = \text{False}$
22          |   $k_{i+1} = (K_{i+1} - 2)/4$
23          |   return $(k_{i+1}, \text{up}_{i+1})$
24         $K = K - 4$
25
26     return $(k_i, \text{up}_i)$  // return old value
```

FIG. 3 under this patent.

ITERATIVE QUANTUM AMPLITUDE ESTIMATION

BACKGROUND

The subject disclosure relates to quantum amplitude estimation, and more specifically, to iterative quantum amplitude estimation.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that facilitate iterative quantum amplitude estimation are described.

According to an embodiment, a system can comprise a memory that stores computer executable components and a processor that executes the computer executable components stored in the memory. The computer executable components can comprise an iterative quantum amplitude estimation component that increases a multiplier value of a confidence interval in an estimation problem to a defined value that positions the confidence interval in a defined plane of a defined circle. The computer executable components can further comprise a measurement component that captures a quantum state measurement of a qubit in a quantum circuit based on the defined value.

According to another embodiment, a computer-implemented method can comprise increasing, by a system operatively coupled to a processor, a multiplier value of a confidence interval in an estimation problem to a defined value that positions the confidence interval in a defined plane of a defined circle. The computer-implemented method can further comprise capturing, by the system, a quantum state measurement of a qubit in a quantum circuit based on the defined value.

According to another embodiment, a computer program product facilitating an iterative quantum amplitude estimation process is provided. The computer program product comprising a computer readable storage medium having program instructions embodied therewith, the program instructions executable by a processor to cause the processor to increase, by the processor, a multiplier value of a confidence interval in an estimation problem to a defined value that positions the confidence interval in a defined plane of a defined circle. The program instructions are further executable by the processor to cause the processor to capture, by the processor, a quantum state measurement of a qubit in a quantum circuit based on the defined value.

DESCRIPTION OF THE DRAWINGS

FIGS. 2 and 3 illustrate diagrams of example, non-limiting algorithms that can facilitate iterative quantum amplitude estimation in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Quantum computing is generally the use of quantum-mechanical phenomena for the purpose of performing computing and information processing functions. Quantum computing can be viewed in contrast to classical computing, which generally operates on binary values with transistors. That is, while classical computers can operate on bit values that are either 0 or 1, quantum computers operate on quantum bits (qubits) that comprise superpositions of both 0 and 1, can entangle multiple quantum bits, and use interference.

Quantum computing has the potential to solve problems that, due to their computational complexity, cannot be solved, either at all or for all practical purposes, on a classical computer. Quantum Amplitude Estimation (QAE) is a fundamental quantum algorithm that may achieve a quadratic speed-up over classical Monte Carlo simulation. The QAE algorithm (referred to herein as QAE) finds application in many relevant problems such as pricing or risk analysis. Canonical QAE is a combination of Grover Search and Quantum Phase Estimation (QPE).

Recent prior art shows that the QPE part can be removed without losing the quadratic speed-up. However, a problem with such prior art is that it either lacks a rigorous proof or the involved constants are extremely large (e.g., approximately $10^8$), rendering the prior art unsuitable for practical applications.

Figure 1:
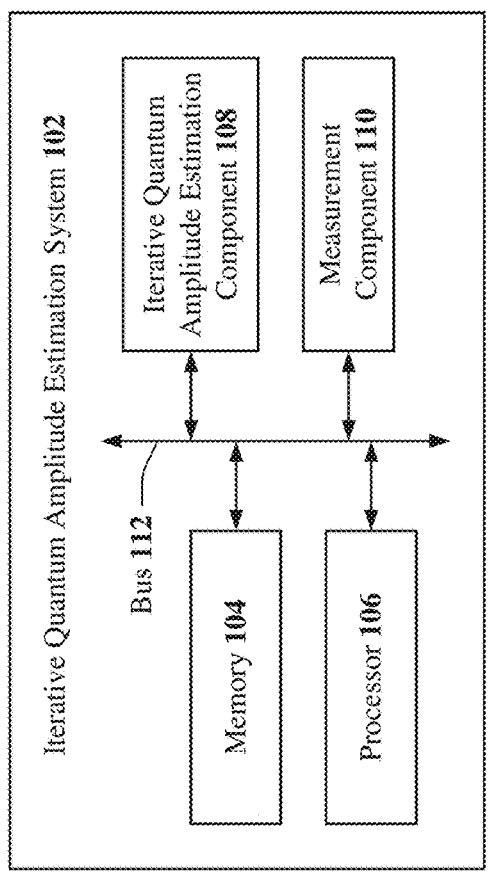
FIG. 1 illustrates a block diagram of an example, non-limiting system that can facilitate iterative quantum amplitude estimation in accordance with one or more embodiments described herein.

FIG. 1 illustrates a block diagram of an example, non-limiting system 100 that can facilitate iterative quantum amplitude estimation in accordance with one or more embodiments described herein. System 100 can comprise an iterative quantum amplitude estimation system 102, which can be associated with a cloud computing environment. For example, iterative quantum amplitude estimation system 102 can be associated with cloud computing environment 950 described below with reference to FIG. 9 and/or one or more functional abstraction layers described below with reference to FIG. 10 (e.g., hardware and software layer 1060, virtualization layer 1070, management layer 1080, and/or workloads layer 1090).

Iterative quantum amplitude estimation system 102 and/or components thereof (e.g., iterative quantum amplitude estimation component 108, measurement component 110, etc.) can employ one or more computing resources of cloud computing environment 950 described below with reference to FIG. 9 and/or one or more functional abstraction layers (e.g., quantum software, etc.) described below with reference to FIG. 10 to execute one or more operations in accordance with one or more embodiments of the subject disclosure described herein. For example, cloud computing environment 950 and/or such one or more functional abstraction layers can comprise one or more classical computing devices (e.g., classical computer, classical processor, virtual machine, server, etc.), quantum hardware, and/or quantum software (e.g., quantum computing device, quantum computer, quantum processor, quantum circuit simulation software, superconducting circuit, etc.) that can be employed by iterative quantum amplitude estimation system 102 and/or components thereof to execute one or more operations in accordance with one or more embodiments of the subject disclosure described herein. For instance, iterative quantum amplitude estimation system 102 and/or components thereof can employ such one or more classical and/or quantum computing resources to execute one or more classical and/or quantum: mathematical function, calculation, and/or equation; computing and/or processing script; algorithm; model (e.g., artificial intelligence (AI) model, machine learning (ML) model, etc.); and/or another operation in accordance with one or more embodiments of the subject disclosure described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Iterative quantum amplitude estimation system 102 can comprise a memory 104, a processor 106, an iterative quantum amplitude estimation component 108, a measurement component 110, and/or a bus 112.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100 and/or iterative quantum amplitude estimation system 102 can further comprise various computer and/or computing-based elements described herein with reference to operating environment 800 and FIG. 8. In several embodiments, such computer and/or computing-based elements can be used in connection with implementing one or more of the systems, devices, components, and/or computer-implemented operations shown and described in connection with FIG. 1 or other figures disclosed herein.

Memory 104 can store one or more computer and/or machine readable, writable, and/or executable components and/or instructions that, when executed by processor 106 (e.g., a classical processor, a quantum processor, etc.), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to iterative quantum amplitude estimation system 102, iterative quantum amplitude estimation component 108, measurement component 110, and/or another component associated with iterative quantum amplitude estimation system 102, as described herein with or without reference to the various figures of the subject disclosure.

Memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 816 and FIG. 8. Such examples of memory 104 can be employed to implement any embodiments of the subject disclosure.

Processor 106 can comprise one or more types of processors and/or electronic circuitry (e.g., a classical processor, a quantum processor, etc.) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, quantum processor, and/or another type of processor. Further examples of processor 106 are described below with reference to processing unit 814 and FIG. 8. Such examples of processor 106 can be employed to implement any embodiments of the subject disclosure.

Iterative quantum amplitude estimation system 102, memory 104, processor 106, iterative quantum amplitude estimation component 108, measurement component 110, and/or another component of iterative quantum amplitude estimation system 102 as described herein can be communicatively, electrically, operatively, and/or optically coupled to one another via a bus 112 to perform functions of system 100, iterative quantum amplitude estimation system 102, and/or any components coupled therewith. Bus 112 can comprise one or more memory bus, memory controller, peripheral bus, external bus, local bus, a quantum bus, and/or another type of bus that can employ various bus architectures. Further examples of bus 112 are described below with reference to system bus 818 and FIG. 8. Such examples of bus 112 can be employed to implement any embodiments of the subject disclosure.

Iterative quantum amplitude estimation system 102 can comprise any type of component, machine, device, facility, apparatus, and/or instrument that comprises a processor and/or can be capable of effective and/or operative communication with a wired and/or wireless network. All such embodiments are envisioned. For example, iterative quantum amplitude estimation system 102 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Iterative quantum amplitude estimation system 102 can be coupled (e.g., communicatively, electrically, operatively, optically, etc.) to one or more external systems, sources, and/or devices (e.g., classical and/or quantum computing devices, communication devices, etc.) via a data cable (e.g., High-Definition Multimedia Interface (HDMI), recommended standard (RS) 232, Ethernet cable, etc.). In some embodiments, iterative quantum amplitude estimation system 102 can be coupled (e.g., communicatively, electrically, operatively, optically, etc.) to one or more external systems, sources, and/or devices (e.g., classical and/or quantum computing devices, communication devices, etc.) via a network.

In some embodiments, such a network can comprise wired and wireless networks, including, but not limited to, a cellular network, a wide area network (WAN) (e.g., the Internet) or a local area network (LAN). For example, iterative quantum amplitude estimation system 102 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, iterative quantum amplitude estimation system 102 can thus include hardware (e.g., a central processing unit (CPU), a transceiver, a decoder, quantum hardware, a quantum processor, etc.), software (e.g., a set of threads, a set of processes, software in execution, quantum pulse schedule, quantum circuit, quantum gates, etc.) or a combination of hardware and software that facilitates communicating information between iterative quantum amplitude estimation system 102 and external systems, sources, and/or devices (e.g., computing devices, communication devices, etc.).

Iterative quantum amplitude estimation system 102 can comprise one or more computer and/or machine readable, writable, and/or executable components and/or instructions that, when executed by processor 106 (e.g., a classical processor, a quantum processor, etc.), can facilitate performance of operations defined by such component(s) and/or instruction(s). Further, in numerous embodiments, any component associated with iterative quantum amplitude estimation system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, iterative quantum amplitude estimation component 108, measurement component 110, and/or any other components associated with iterative quantum amplitude estimation system 102 as disclosed herein (e.g., communicatively, electronically, operatively, and/or optically coupled with and/or employed by iterative quantum amplitude estimation system 102), can comprise such computer and/or machine readable, writable, and/or executable component(s) and/or instruction(s). Consequently, according to numerous embodiments, iterative quantum amplitude estimation system 102 and/or any components associated therewith as disclosed herein, can employ processor 106 to execute such computer and/or machine readable, writable, and/or executable component(s) and/or instruction(s) to facilitate performance of one or more operations described herein with reference to iterative quantum amplitude estimation system 102 and/or any such components associated therewith.

Iterative quantum amplitude estimation system 102 can facilitate (e.g., via processor 106) performance of operations executed by and/or associated with iterative quantum amplitude estimation component 108 and/or measurement component 110. For example, iterative quantum amplitude estimation system 102 can facilitate (e.g., via processor 106): increasing a multiplier value of a confidence interval in an estimation problem to a defined value that positions the confidence interval in a defined plane of a defined circle; and/or capturing a quantum state measurement of a qubit in a quantum circuit based on the defined value. In another example, as described in detail below, iterative quantum amplitude estimation system 102 can further facilitate via processor 106 (e.g., a classical processor, a quantum processor, etc.): computing one or more next values of the multiplier value based on an upper bound value and a lower bound value of a defined confidence interval to iteratively increase the multiplier value of the confidence interval; capturing quantum state measurements of the qubit based on different multiplier values of the confidence interval; combining the quantum state measurements to estimate a property of interest value in the confidence interval; generating a proof to support an estimation of a property of interest value in the confidence interval; and/or estimating a property of interest value in the confidence interval based on the defined value. In the examples above: the defined circle can comprise a unit circle; the defined plane of the defined circle can comprise an upper half plane or a lower half plane of the defined circle; the confidence interval can comprise an angle that corresponds to a probability of measuring a defined quantum state in a target qubit of the quantum circuit; and/or the multiplier value of the confidence interval can correspond to a power value of a Grover operator in the estimation problem.

To facilitate performance of one or more of such operations described above in accordance with one or more embodiments of the subject disclosure, iterative quantum amplitude estimation system 102 (e.g., via processor 106, iterative quantum amplitude estimation component 108, and/or measurement component 110) can derive and/or implement a new variant of QAE without QPE as described below. Such a new variant is denoted herein as Iterative Quantum Amplitude Estimation (IQAE).

The following description first provides a background on one or more algorithms iterative quantum amplitude estimation system 102 (e.g., via processor 106, iterative quantum amplitude estimation component 108, and/or measurement component 110) can employ to derive and/or implement IQAE. The following description further provides a detailed description of how iterative quantum amplitude estimation system 102 (e.g., via processor 106, iterative quantum amplitude estimation component 108, and/or measurement component 110) can derive and/or implement IQAE to perform one or more of such operations described above in accordance with one or more embodiments of the subject disclosure. For example, as described below, in some embodiments, iterative quantum amplitude estimation system 102 (e.g., via processor 106, iterative quantum amplitude estimation component 108, and/or measurement component 110) can modify and/or combine such one or more algorithms to derive and/or implement IQAE. In another example, as described below, in some embodiments, iterative quantum amplitude estimation system 102 (e.g., via processor 106, iterative quantum amplitude estimation component 108, and/or measurement component 110) can utilize only one or more portions of such one or more algorithms to derive and/or implement IQAE. In another example, as described below, in some embodiments, iterative quantum amplitude estimation system 102 (e.g., via processor 106, iterative quantum amplitude estimation component 108, and/or measurement component 110) can add one or more new functions, equations, computations, and/or operations to such one or more algorithms to derive and/or implement IQAE.

1) Background on Algorithms to Derive and/or Implement IQAE

In implementing QAE, a problem of interest such as, for instance, an estimation problem can be given by an operator $\mathcal{A}$ acting on n+1 qubits such that:

$$\mathcal{A}|0\rangle_n|0\rangle = \sqrt{1-a}|\psi_0\rangle_n|0\rangle + \sqrt{a}|\psi_1\rangle_n|1\rangle \quad (1)$$

where $a \in [0,1]$ is the unknown (e.g., the property of interest), and $|\psi_0\rangle_n$ and $|\psi_1\rangle_n$ are two normalized states, not necessarily orthogonal. QAE can be implemented to estimate the property of interest a with high probability such that the estimation error scales as $\mathcal{O}(1/M)$, where M corresponds to the number of applications of $\mathcal{A}$. To this extent, an operator $\mathcal{A} = -\mathcal{S}_{\psi_0}^\dagger \mathcal{S}_0$ can be defined where $\mathcal{S}_{\psi_0} = \mathcal{A} - 2|\psi_0\rangle\langle\psi_0|\otimes|0\rangle\langle 0|$ and $\mathcal{S}_0 = \mathcal{S} - 2|0\rangle_{n+1}\langle 0_{n+1}|$. As referenced herein, applications of $\mathcal{A}$ can denote quantum samples or oracle queries.

The canonical QAE follows the form of Quantum Phase Estimation (QPE): it can use m ancilla qubits—initialized in equal superposition—to represent the final result, it can define the number of quantum samples as $M=2^m$ and it can apply geometrically increasing powers of $\mathcal{A}$ controlled by the ancillas. Eventually, it can perform a Quantum Fourier Transform (QFT) on the ancilla qubits before they are measured. Subsequently, the measured integer $y \in \{0, \ldots, M-1\}$ can be mapped to an angle $\tilde{\theta}_a = y\pi/M$. Thereafter, the resulting estimate of a can be defined as $\tilde{a} = \sin^2(\tilde{\theta}_a)$. Then, with a probability of at least $8/\pi^2 \approx 81$ percent (%), the estimate $\tilde{a}$ can satisfy:

$$|a - \tilde{a}| \leq \frac{2\pi\sqrt{a(1-a)}}{M} + \frac{\pi^2}{M^2} \quad (2)$$

which implies the quadratic speedup over a classical Monte Carlo (MC) simulation, that is, the estimation error $\varepsilon = \mathcal{O}(1/M)$. The success probability can quickly be boosted to close to 100% by repeating this multiple times and using the median estimate. These estimates $\tilde{a}$ are restricted to the grid $\{\sin^2(y\pi/M): y=0, \ldots, M/2\}$ through the possible measurement outcomes of y.

Alternatively, and similarly to Maximum Likelihood Amplitude Estimation (MLAE), it is possible to apply Maximum Likelihood Estimation (MLE) to the observations for y. For a given $\theta_a$, the probability of observing $|y\rangle$ when measuring the ancilla qubits can be given by:

$$\mathbb{P}[|y\rangle] = \frac{\sin^2(M\Delta\pi)}{M^2\sin^2(\Delta\pi)} \quad (3)$$

where $\Delta$ is the minimal distance on the unit circle between the angles $\theta_a$ and $\pi\tilde{y}/M$, and $\tilde{y}=y$ if $y \leq M/2$ and $\tilde{y}=M/2-y$ otherwise. Given a set of y-measurements, this can be leveraged in an MLE to get an estimate of $\theta_a$ that is not restricted to grid points. Furthermore, it allows use of the likelihood ratio to derive confidence intervals. The likelihood ratio confidence intervals can be more reliable than other possible approaches such as, for instance, the Fisher information (e.g., the observed Fisher information). Thus, as described below, the term QAE can be used (e.g., by iterative quantum amplitude estimation system 102) for the canonical QAE with the application of MLE to the y measurements to derive an improved estimate and confidence intervals based on the likelihood ratio.

All variants of QAE without QPE—including IQAE as described herein in accordance with one or more embodiments—can be based on:

$$\mathcal{A}^k \mathcal{A}|0\rangle_n|0\rangle = \cos((2k+1)\theta_a)|\psi_0\rangle_n|0\rangle + \sin((2k+1)\theta_a)|\psi_1\rangle_n|1\rangle \quad (4)$$

$$\sin(2k+1)\theta_a)|\psi_1\rangle_n|1\rangle \quad (4)$$

where $\theta_a$ can be defined (e.g., by iterative quantum amplitude estimation system 102) as $a=\sin^2(\theta_a)$, and where, as referenced herein, a denotes a property of interest in an estimation problem. In other words, the probability of measuring $|1\rangle$ in a target qubit (also referred to herein as the last qubit) can be given (e.g., via iterative quantum amplitude estimation system 102) by:

$$\mathbb{P}[|1\rangle] = \sin^2 = \sin^2((2k+1)\theta_a) \quad (5)$$

The algorithms described here mainly differ in how they derive the different values for the powers k of $\mathcal{A}$ and how they combine the results into a final estimate of a.

MLAE can be implemented to first approximate $\mathbb{P}[|1\rangle]$ for $k=2^j$ and $j=0, 1, 2, \ldots, m-1$, for a given m, using $N_{shots}$ measurements from a quantum computer (e.g., quantum computing device, quantum processor, quantum circuit simulation software, superconducting circuit, etc.) for each j, that is, in total, Q can be applied $N_{shots}(M-1)$ times, where $M=2^m$. The corresponding Fisher information can scale as $\mathcal{)}(N_{shots}M^2)$, which implies a lower bound of the estimation error scaling as $\mathcal{A}(1/(\sqrt{N_{shots}}M))$. However, an upper bound for the estimation error is not provided. Confidence intervals can be derived from the measurements using, for example, the likelihood ratio approach.

In contrast to MLAE, QAE Simplified (QAES) involves evaluating the different powers of $\mathcal{A}$ iteratively and cannot be parallelized. QAES iteratively adapts the powers of $\mathcal{A}$ to successively improve the estimate and carefully determines the next power of $\mathcal{A}$. However, instead of a lower bound, a rigorous error bound is provided. QAES achieves the optimal asymptotic query complexity $\mathcal{A}(\log(1/\alpha)/\varepsilon)$, where $\alpha>0$ denotes the probability of failure. In contrast to other related and/or similar algorithms, QAES provides a bound on the relative estimation error. Although QAES achieves the desired asymptotic scaling, the constants involved are very large—likely too large for practical applications unless they can be further reduced.

The following detailed description illustrates how iterative quantum amplitude estimation system 102 (e.g., via processor 106, iterative quantum amplitude estimation component 108, and/or measurement component 110) can derive and/or implement the new variant of QAE without QPE, denoted herein as IQAE. As for QAES, iterative quantum amplitude estimation system 102 (e.g., via processor 106, iterative quantum amplitude estimation component 108, and/or measurement component 110) can further provide a rigorous performance proof. As described below, iterative quantum amplitude estimation system 102 (e.g., via processor 106, iterative quantum amplitude estimation component 108, and/or measurement component 110) can derive and/or implement IQAE to achieve the quadratic speedup up to a multiplicative factor $\log(2/\alpha \log 2 (\pi/4\varepsilon))$, where the constants involved are orders of magnitude smaller than those for QAES. It should be noted that in practice this factor is relatively small for any reasonable target accuracy $\varepsilon$ and confidence level $1-\alpha$.

2) Derivation and Implementation of IQAE

In accordance with one or more embodiments described herein, based on the one or more algorithms described above, iterative quantum amplitude estimation system 102 (e.g., via processor 106) can derive an algorithm that can define IQAE. For example, in these embodiments, iterative quantum amplitude estimation system 102 (e.g., via processor 106) can derive algorithm 200 illustrated in FIG. 2, where algorithm 200 can comprise a formal definition of IQAE. Additionally, or alternatively, in these embodiments, iterative quantum amplitude estimation system 102 (e.g., via processor 106) can derive algorithm 300 illustrated in FIG. 3, where algorithm 300 can comprise a formal definition of the procedure to perform the FindNextK sub-routine referenced in line 10 of algorithm 200.

FIGS. 2 and 3 illustrate diagrams of example, non-limiting algorithms 200 and 300, respectively, that can facilitate IQAE in accordance with one or more embodiments described herein. In various embodiments, as described below, when implemented by iterative quantum amplitude estimation system 102 (e.g., via processor 106, iterative quantum amplitude estimation component 108, and/or measurement component 110), algorithms 200 and 300 illustrated in FIGS. 2 and 3, respectively, can facilitate improved efficiency over the one or more algorithms described above (e.g., QAE, MLAE, MLE, QAES, etc.) while still allowing for a rigorous upper bound on the estimation error and computational complexity.

Returning to FIG. 1, in various embodiments, iterative quantum amplitude estimation system 102 can facilitate implementation of algorithms 200 and/or 300 to estimate the value of a property of interest in an estimation problem. For example, iterative quantum amplitude estimation system 102 can employ iterative quantum amplitude estimation component 108 to implement (e.g., via processor 106) algorithms 200 and 300 to estimate the value of a property of interest (e.g., a property of interest value denoted herein and/or in the figures as a and/or $\mathbb{P}|1\rangle$) in an estimation problem, where iterative quantum amplitude estimation system 102 can employ measurement component 110 to perform the measuring function referenced in line 11 of algorithm 200. In this example, iterative quantum amplitude estimation component 108 can implement (e.g., via processor 106) algorithms 200 and 300 to increase (e.g., once or iteratively) a multiplier value of a confidence interval in an estimation problem to a defined value (e.g., the largest value, desired value, target value, etc.) that positions the confidence interval in a defined plane (e.g., an upper half plane or a lower half plane) of a defined circle such as, for instance, a unit circle. In this example: the confidence interval can comprise an angle that corresponds to a probability of measuring a defined quantum state (e.g., $|0\rangle$ or $|1\rangle$) in a target qubit (e.g., the last qubit) of a quantum circuit (e.g., a quantum computer, a quantum computing device, a quantum processor, a superconducting circuit, etc.); and/or the multiplier value of the confidence interval can correspond to a power value of a Grover operator in the estimation problem In the example above, measurement component 110 can capture a quantum state measurement of a qubit in a quantum circuit based on the defined value to enable iterative quantum amplitude estimation component 108 to further estimate (e.g., by implementing lines 12-22 of algorithm 200) a property of interest value in the confidence interval. Measurement component 110 can comprise, for instance, an arbitrary waveform generator (AWG), a vector network analyzer (VNA), and/or another device that can capture one or more quantum state measurements of one or more qubits (e.g., a target qubit, the last qubit, etc.) in a quantum system (e.g., a quantum circuit, a quantum computer, a quantum computing device, a quantum processor, a superconducting circuit, etc.).

In an example embodiment, iterative quantum amplitude estimation component 108 can implement (e.g., via processor 106) algorithms 200 and 300 illustrated in FIGS. 2 and 3, respectively, to increase (e.g., once or iteratively) a multiplier value of a confidence interval in an estimation problem to a defined value (e.g., the largest value, desired value, target value, etc.) that positions the confidence interval in a defined plane (e.g., an upper half plane or a lower half plane) of a defined circle such as, for instance, a unit circle. In this example embodiment, such a process can comprise an iterative process that can be repeated and can be represented visually by, for instance, trigonometric diagram 400 depicted in FIG. 4 and described below.

Figure 4:
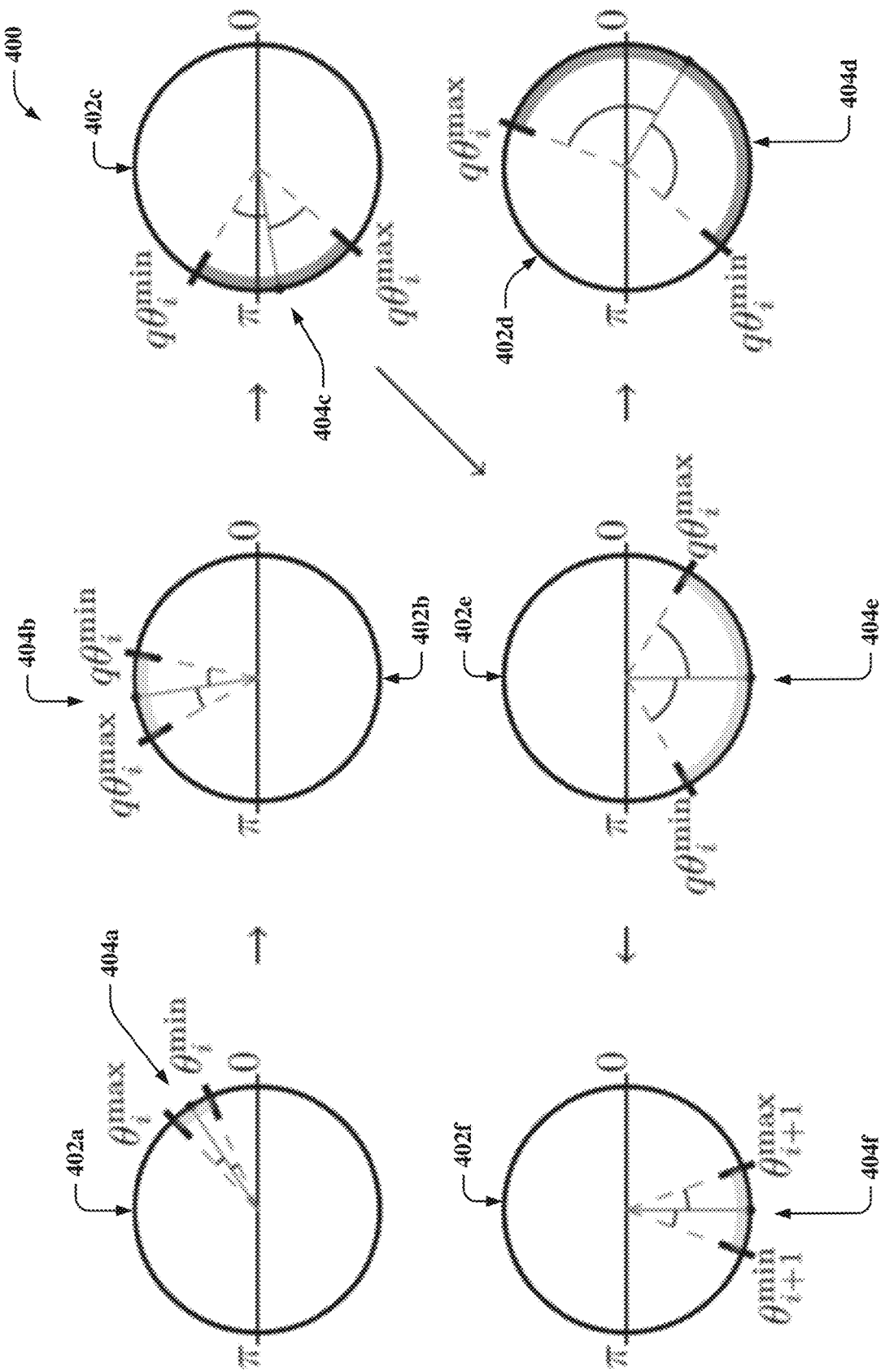
FIG. 4 illustrates an example, non-limiting trigonometric diagram that can facilitate iterative quantum amplitude estimation in accordance with one or more embodiments described herein.

FIG. 4 illustrates an example, non-limiting trigonometric diagram 400 that can facilitate IQAE in accordance with one or more embodiments described herein. Repetitive description of like elements and/or processes employed in respective embodiments is omitted for sake of brevity.

As described above, iterative quantum amplitude estimation component 108 can implement (e.g., via processor 106) algorithms 200 and 300 to increase (e.g., once or iteratively) a multiplier value of a confidence interval in an estimation problem to a defined value (e.g., the largest value, desired value, target value, etc.) that positions the confidence interval in a defined plane (e.g., an upper half plane or a lower half plane) of a defined circle such as, for instance, a unit circle. For example, with reference to FIG. 4, iterative quantum amplitude estimation component 108 can implement (e.g., via processor 106) algorithms 200 and 300 to increase (e.g., once or iteratively) a multiplier value (denoted as q in FIG. 4) of confidence interval 404a, 404b, 404c, 404d, 404e, or 404f to a defined value (e.g., the largest multiplier value, desired value, target value, etc.) that positions the confidence interval in an upper half plane or a lower half plane of unit circle 402a, 402b, 402c, 402d, 402e, or 402f. In this example: confidence interval 404a, 404b, 404c, 404d, 404e, and/or 404f can comprise an angle that corresponds to a probability of measuring a defined quantum state (e.g., $|0\rangle$ or $|1\rangle$) in a target qubit (e.g., the last qubit) of a quantum circuit (e.g., a quantum computer, a quantum computing device, a quantum processor, a superconducting circuit, etc.); and/or the multiplier value (denoted as q in FIG. 4) of confidence interval 404a, 404b, 404c, 404d, 404e, and/or 404f can correspond to a power value of a Grover operator in the estimation problem.

In the example above, iterative quantum amplitude estimation component 108 can implement algorithm 300 depicted in FIG. 3 to compute one or more next values of the multiplier value based on an upper bound value and a lower bound value of a defined confidence interval (e.g., confidence interval 404a depicted in FIG. 4) to iteratively increase the multiplier value of the confidence interval as illustrated in FIG. 4. For instance, with reference to FIGS. 2, 3, and 4, based on an initial interval [$\theta_l$, $\theta_u$], $k_i$, and $K_i=4k_i+2$, iterative quantum amplitude estimation component 108 can implement (e.g., via processor 106) the FindNextK procedure defined in algorithm 300 depicted in FIG. 3 to determine the largest feasible k with K=4k+2≥2$K_i$ such that the scaled interval [K$\theta_l$, K$\theta_u$]$_{mod2\pi}$ lies either in the upper half plane or in the lower half plane of a unit circle (e.g., as illustrated by unit circle 402b and/or 402e in FIG. 4), and returns k if it exists and $k_i$ otherwise.

In an example, with reference to FIG. 4, unit circle 402a can represent initial knowledge about $K_i\theta_a$, while unit circle 402b, 402c, 402d, 402e, or 402f can represent extrapolations for different values of the multiplier value q=K/$K_i$. In this example, unit circle 402b can comprise a valid q (e.g., an acceptable multiplier value), as the value of q positions confidence interval 404b in the upper half plane of unit circle 402b. In this example, unit circle 402c can comprise an invalid q (e.g., an unacceptable multiplier value), as the value of q positions confidence interval 404c in both the upper half plane and the lower half plane of unit circle 402c. In this example, unit circle 402d violates the condition q·|$\theta_i^{max}$−$\theta_i^{min}$|≤π/2, as confidence interval 404d is too wide and cannot lie entirely in a single half plane of unit circle 402d (e.g., confidence interval 404d cannot lie entirely in either the upper half plane or the lower half plane of unit circle 402d). In this example, the output of algorithm 300 (e.g., when implemented by iterative quantum amplitude estimation component 108) can comprise confidence interval 404e depicted in unit circle 402e and confidence interval 404f depicted in unit circle 402f can comprise an improved output result of algorithm 300 that can be generated in a next iteration after additional measurements have been captured (e.g., additional measurements captured by measurement component 110).

In various embodiments, based on different multiplier values that can be computed (e.g., iteratively) by iterative quantum amplitude estimation component 108 as described above (e.g., via implementation of algorithm 300 depicted in FIG. 3), measurement component 110 can capture multiple quantum state measurements of one or more qubits (e.g., a target qubit, the last qubit, etc.) in a quantum system (e.g., a quantum circuit, a quantum computer, a quantum computing device, a quantum processor, a superconducting circuit, etc.) based on (e.g., using) such different multiplier values. In these embodiments, iterative quantum amplitude estimation component 108 can combine the quantum state measurements (e.g., via implementation of lines 12 and 13 in algorithm 200 depicted in FIG. 2) to estimate a property of interest value in the confidence interval (e.g., via implementation of lines 11-22 in algorithm 200 depicted in FIG. 2).

Returning to FIG. 1, in various embodiments, in implementing algorithms 200 and 300, iterative quantum amplitude estimation component 108 can use a quantum computer (e.g., quantum computing device, quantum processor, quantum circuit simulation software, superconducting circuit, etc.) to approximate $\mathbb{P}[|1\rangle]=\sin^2((2k+1)\theta_a)$ for a target qubit (the last qubit) in $\mathcal{A}^k\mathcal{A}|0\rangle_n|0\rangle$ for different powers k. In these embodiments, based on a confidence interval $[\theta_l, \theta_u]\subseteq[0,\pi/2]$ for $\theta_a$ and a power k of $\mathcal{A}$, as well as an estimate for $\sin^2((2k+1)\theta_a)$, by exploiting the trigonometric identity $\sin^2(x)=(1-\cos(2x))/2$, iterative quantum amplitude estimation component 108 can translate estimates for $\sin^2((2k+1)\theta_a)$ into estimates for $\cos((4k+2)\theta_a)$. In these embodiments, iterative quantum amplitude estimation component 108 can estimate the square of sine ($\sin^2$) and can invert the cosine alone without ambiguity if the argument (e.g., confidence interval 404a, 404b, 404c, 404d, 404e, or 404f) is restricted to either $[0,\pi]$ or $[\pi, 2\pi]$, that is, if the argument is restricted to either the upper or lower half plane of a unit circle (e.g., unit circle 402a, 402b, 402c, 402d, 402e, or 402f depicted in FIG. 4). In these embodiments, iterative quantum amplitude estimation component 108 can find the largest k such that the scaled interval $[(4k+2)\theta_l, (4k+2)\theta_u]_{mod 2\pi}$ is fully contained either in $[0,\pi]$ or $[\pi, 2\pi]$. In these embodiments, iterative quantum amplitude estimation component 108 can invert $\cos((4k+2)\theta_a)$ and improve the estimate for $\theta_a$ with high confidence (e.g., with high confidence based on Therorem 1 described below). In these embodiments, this implies an upper bound of k, and the heart of IQAE defined in algorithm 200 depicted in FIG. 2 is the procedure used to find the next k given $[\theta_l, \theta_u]$, which is defined in algorithm 300 illustrated in FIG. 3.

In accordance with one or more embodiments described herein, iterative quantum amplitude estimation system 102 can employ iterative quantum amplitude estimation component 108 to increase (e.g., once or iteratively) the multiplier value of the confidence interval to the defined value and/or to combine quantum state measurements captured by measurement component 110 based on numerous different multiplier values to estimate the value of a property of interest in the confidence interval as described above. In these embodiments, iterative quantum amplitude estimation system 102 can employ iterative quantum amplitude estimation component 108 to increase (e.g., once or iteratively) the multiplier value and/or to combine such quantum state measurements as described above to facilitate at least one of improved application of a QAE algorithm, improved performance of a processor (e.g., processor 106, a quantum processor, etc.) that can be used to implement IQAE (e.g., used to implement algorithms 200 and 300), or reduced computational costs of such a processor.

In the embodiments described above, by employing iterative quantum amplitude estimation component 108 to increase (e.g., once or iteratively) the multiplier value and/or to combine such quantum state measurements as described above (e.g., by implementing algorithms 200 and 300), iterative quantum amplitude estimation system 102 and/or iterative quantum amplitude estimation component 108 can thereby reduce the number of qubits, gates, and/or oracle calls involved with estimating a property of interest in an estimation problem (e.g., when compared to the one or more algorithms described above such as, for instance, QAE, MLAE, MLE, QAES, etc.). In these embodiments, by reducing the number of qubits, gates, and/or oracle calls involved with estimating a property of interest in an estimation problem, iterative quantum amplitude estimation system 102 and/or iterative quantum amplitude estimation component 108 can thereby reduce the workload of a processor (e.g., processor 106, a quantum processor, etc.) used to estimate (e.g., via implementing the IQAE algorithms 200 and 300) the value of a property of interest in an estimation problem. In these embodiments, by reducing the workload of such a processor (e.g., processor 106, a quantum processor, etc.) used to estimate the value of a property of interest in an estimation problem, iterative quantum amplitude estimation system 102 and/or iterative quantum amplitude estimation component 108 can thereby improve the processing performance of such a processor and/or reduce the computational costs of such a processor.

In some embodiments, iterative quantum amplitude estimation component 108 can generate a proof to support estimates for $\theta_a$ that it can generate by implementing (e.g., via processor 106) algorithms 200 and 300. For example, iterative quantum amplitude estimation component 108 can generate such a proof to yield Theorem 1 described below. In this example, Theorem 1 can provide convergence results for IQAE (e.g., defined by algorithms 200 and 300) that can facilitate the aforementioned quadratic speedup in embodiments where iterative quantum amplitude estimation component 108 implements IQAE (e.g., in embodiments where iterative quantum amplitude estimation component 108 implements algorithms 200 and 300).

Theorem 1 (Proving Correctness of IQAE)

In an embodiment, iterative quantum amplitude estimation component 108 can define a confidence level $1-\alpha\in(0, 1)$, a target accuracy $\epsilon>0$, and a number of shots $N_{shots}\in\{1, \ldots, N_{max}(\epsilon,\alpha)\}$, where:

$$N_{max}(\varepsilon, \alpha) = \frac{192}{(1-2\sin(\pi/14))^2}\log\left(\frac{2}{\alpha}\log_2\left(\frac{\pi}{4\varepsilon}\right)\right)$$

In this embodiment, iterative quantum amplitude estimation component 108 can implement (e.g., via processor 106) algorithm 200 illustrated in FIG. 2, where algorithm 200 comprises a formal definition of IQAE in accordance with one or more embodiments described herein. In this embodiment, iterative quantum amplitude estimation component 108 can implement algorithm 200 such that it can terminate after a maximum number of $\log_2(\pi/8\varepsilon)$ iterations, where one iteration can be defined as a set of iterations with the same $k_i$, and each iteration can comprise at most $N_{max}(\varepsilon,\alpha)/N_{shots}$ iterations. In this embodiment, iterative quantum amplitude estimation component 108 can implement algorithm 200 to compute $[\theta_l, \theta_u]$ with $\theta_u - \theta_l \leq 2\varepsilon$ and $$\mathbb{P}_{[\theta_a \notin [\theta_l, \theta_u]]} \leq \alpha \qquad (6)$$

and return $[a_l, a_u]$ with $a_u - a_l \leq 2\varepsilon$ and $$\mathbb{P}_{[a \notin [a_l, a_u]]} \leq \alpha \qquad (7)$$

Thus, in this embodiment, $\tilde{a} = (a_l + a_u)/2$ can yield an estimate for a with $|a - \tilde{a}| \leq \varepsilon$ with a confidence of $1 - \alpha$.

Furthermore, in this embodiment, for the total number of $\mathcal{A}$-applications, $N_{oracle}$, it holds that $$N_{oracle} < \frac{300}{\varepsilon} \log\left(\frac{2}{\alpha} \log_2\left(\frac{\pi}{4\varepsilon}\right)\right) \qquad (8)$$

Note, in this embodiment, the maximum number of applications of $\mathcal{A}$ given in Theorem 1 can comprise a loose (e.g., approximate) upper bound due to use of a Chernoff bound by iterative quantum amplitude estimation component 108 to estimate intermediate confidence intervals in algorithm 200. Alternatively, in some embodiments, iterative quantum amplitude estimation component 108 can use a more accurate technique instead (e.g., Clopper-Pearson's confidence interval for Bernoulli distributions), which can significantly lower the constant in $N_{max}$ but this technique is more complex to analyze.

Continuing with the embodiment above, iterative quantum amplitude estimation component 108 can implement algorithm 300 such that $K_{i+1}/K_i \geq 2$, otherwise continue with $K_i$. In this embodiment, iterative quantum amplitude estimation component 108 can choose the lower bound somewhat arbitraryly and can further adjust the proof that can yield Theorem 1 to any value strictly larger than one.

In this embodiment, Theorem 1 can provide a bound on the query complexity, that is, the total number of oracle calls with respect to the target accuracy. However, in this embodiment, it is should be noted that the computational complexity, that is, the overall number of operations, including classical computing steps such as, for instnace, all applications of FindNextK and computing the intermediate confidence intervals, can scale in exactly the same way.

Iterative quantum amplitude estimation system 102 can be associated with various technologies. For example, iterative quantum amplitude estimation system 102 can be associated with quantum computing technologies, quantum hardware and/or software technologies, quantum algorithm technologies, machine learning technologies, artificial intelligence technologies, cloud computing technologies, and/or other technologies.

Iterative quantum amplitude estimation system 102 can provide technical improvements to systems, devices, components, operational steps, and/or processing steps associated with the various technologies identified above. For example, iterative quantum amplitude estimation system 102 can reduce the number of qubits, gates, and/or oracle calls involved with estimating a property of interest in an estimation problem (e.g., when compared to the one or more algorithms described above such as, for instance, QAE, MLAE, MLE, QAES, etc.). In this example, by reducing the number of qubits, gates, and/or oracle calls involved with estimating a property of interest in an estimation problem, iterative quantum amplitude estimation system 102 can thereby facilitate at least one of improved application of a QAE algorithm or reduced workload of a processor (e.g., processor 106, a quantum processor, etc.) used to estimate the value of a property of interest in an estimation problem.

In another example, by combining quantum state measurements captured by measurement component 110 based on numerous different multiplier values computed by iterative quantum amplitude estimation system 102 as described above (e.g., via implementing lines 12 and 13 of algorithm 200), iterative quantum amplitude estimation system 102 can reduce the number of such quantum state measurements involved with estimating the value of a property of interest in an estimation problem. In this example, by reducing the number of such quantum state measurements, iterative quantum amplitude estimation system 102 can thereby facilitate at least one of improved application of a QAE algorithm, improved performance of a processor (e.g., processor 106, a quantum processor, etc.) that can be used to implement IQAE (e.g., used to implement algorithms 200 and 300), or reduced computational costs of such a processor.

Iterative quantum amplitude estimation system 102 can provide technical improvements to a processing unit (e.g., processor 106, a quantum processor, etc.) associated with a classical computing device and/or a quantum computing device (e.g., a quantum processor, quantum hardware, superconducting circuit, etc.) associated with iterative quantum amplitude estimation system 102. For example, as described above, by reducing the number of qubits, gates, oracle calls, and/or quantum state measurements involved with estimating the value of a property of interest in an estimation problem, iterative quantum amplitude estimation system 102 can thereby facilitate reduced workload of a processor (e.g., processor 106, a quantum processor, etc.) used to estimate the value of the property of interest (e.g., via implementing the IQAE algorithms 200 and 300 as described herein). In this example, as described above, by reducing the workload of such a processor (e.g., processor 106, a quantum processor, etc.), iterative quantum amplitude estimation system 102 can thereby facilitate at least one of improved performance of such a processor or reduced computational costs of such a processor.

Based on such reduced number of qubits, gates, oracle calls, and/or quantum state measurements involved with estimating the value of a property of interest in an estimation problem as described above, a practical application of iterative quantum amplitude estimation system 102 is that it can be implemented by a quantum computing system and/or administrator (e.g., vendor) operating such a system to execute a QAE algorithm and/or the new variant of QAE described herein (IQAE) in a variety of domains and/or on a variety of problems ranging in complexity.

It should be appreciated that iterative quantum amplitude estimation system 102 provides a new approach driven by relatively new quantum computing technologies. For example, iterative quantum amplitude estimation system 102 provides a new approach to efficiently estimate the value of a property of interest in an estimation problem on a quantum computing device that is driven by currently long and computationally expensive methods (e.g., QAE, MLAE, MLE, QAES, etc.) used to estimate the value of such a property of interest.

Iterative quantum amplitude estimation system 102 can employ hardware or software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, a specialized quantum computer, etc.) to execute defined tasks related to the various technologies identified above. Iterative quantum amplitude estimation system 102 and/or components thereof, can be employed to solve new problems that arise through advancements in technologies mentioned above, employment of quantum computing systems, cloud computing systems, computer architecture, and/or another technology.

It is to be appreciated that iterative quantum amplitude estimation system 102 can utilize various combinations of electrical components, mechanical components, and circuitry that cannot be replicated in the mind of a human or performed by a human, as the various operations that can be executed by iterative quantum amplitude estimation system 102 and/or components thereof as described herein are operations that are greater than the capability of a human mind. For instance, the amount of data processed, the speed of processing such data, or the types of data processed by iterative quantum amplitude estimation system 102 over a certain period of time can be greater, faster, or different than the amount, speed, or data type that can be processed by a human mind over the same period of time.

According to several embodiments, iterative quantum amplitude estimation system 102 can also be fully operational towards performing one or more other functions (e.g., fully powered on, fully executed, etc.) while also performing the various operations described herein. It should be appreciated that such simultaneous multi-operational execution is beyond the capability of a human mind. It should also be appreciated that iterative quantum amplitude estimation system 102 can include information that is impossible to obtain manually by an entity, such as a human user. For example, the type, amount, and/or variety of information included in iterative quantum amplitude estimation system 102, iterative quantum amplitude estimation component 108, and/or measurement component 110 can be more complex than information obtained manually by a human user.

Figure 5:
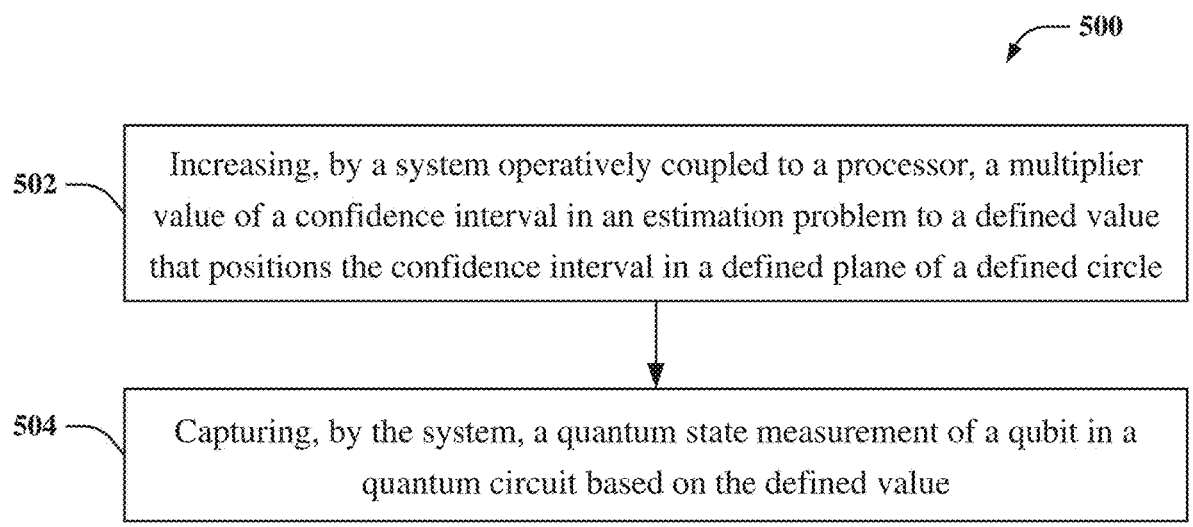
FIGS. 5, 6, and 7 illustrate flow diagrams of example, non-limiting computer-implemented methods that can facilitate iterative quantum amplitude estimation in accordance with one or more embodiments described herein.

FIG. 5 illustrates a flow diagram of an example, non-limiting computer-implemented method 500 that can facilitate iterative quantum amplitude estimation in accordance with one or more embodiments described herein. Repetitive description of like elements and/or processes employed in respective embodiments is omitted for sake of brevity.

At 502, computer-implemented method 500 can comprise increasing (e.g., once or iteratively), by a system (e.g., via iterative quantum amplitude estimation system 102 and/or iterative quantum amplitude estimation component 108) operatively coupled to a processor (e.g., processor 106, a quantum processor, etc.), a multiplier value (denoted as q in FIG. 4) of a confidence interval (e.g., confidence interval 404a, 404b, 404c, 404d, 404e, 404f, etc.) in an estimation problem to a defined value (e.g., the largest multiplier value, desired value, target value, etc.) that positions the confidence interval (e.g., the entire confidence interval) in a defined plane (e.g., the upper half plane or the lower half plane) of a defined circle (e.g., a unit circle such as, for instance, unit circle 402a, 402b, 402c, 402d, 402e, 402f, etc.).

At 504, computer-implemented method 500 can comprise capturing, by the system (e.g., via iterative quantum amplitude estimation system 102 and/or measurement component 110), a quantum state measurement of a qubit in a quantum circuit (e.g., a quantum computer, a quantum computing device, a quantum processor, a superconducting circuit, etc.) based on the defined value.

Figure 6:
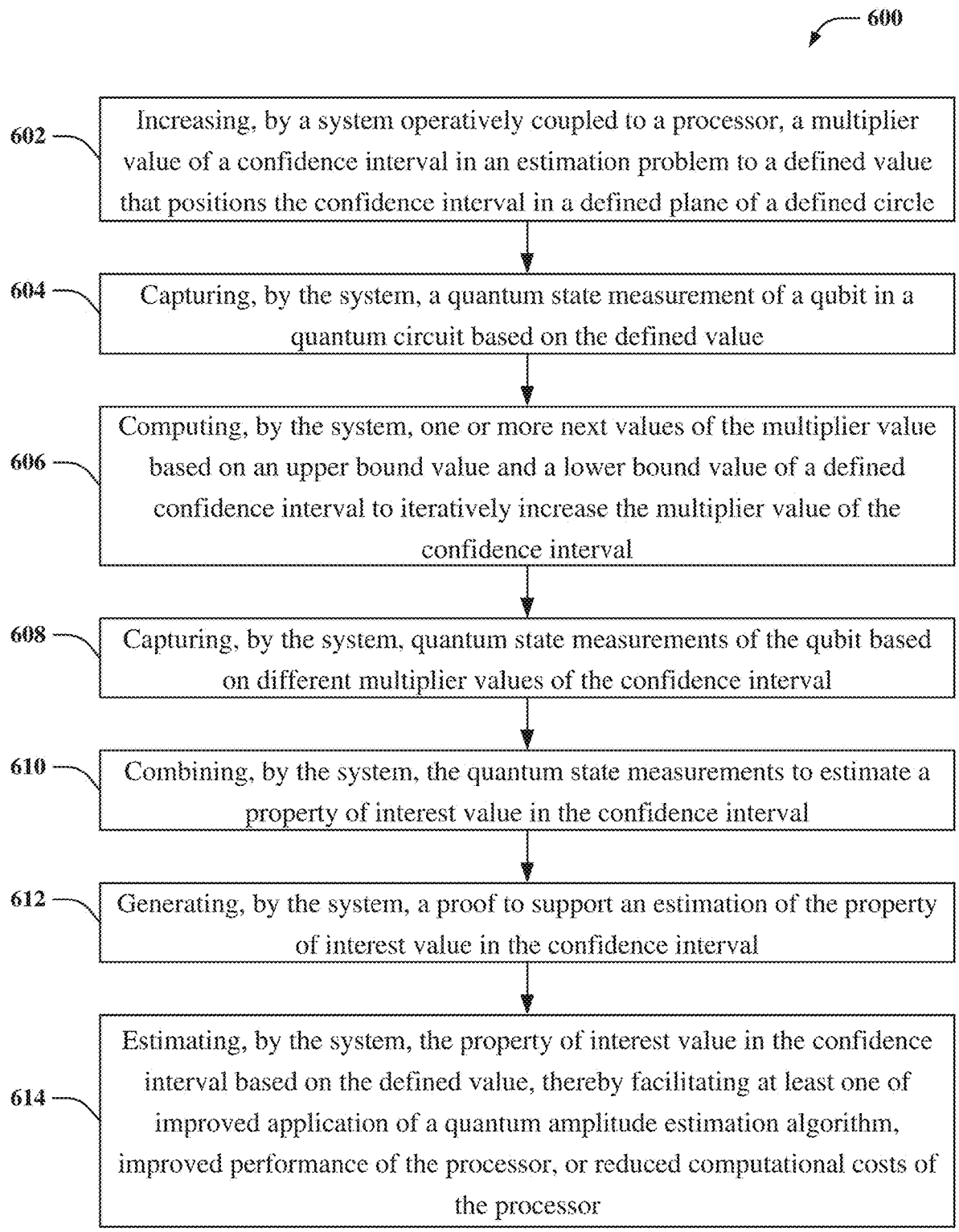

FIG. 6 illustrates a flow diagram of an example, non-limiting computer-implemented method 600 that can facilitate iterative quantum amplitude estimation in accordance with one or more embodiments described herein. Repetitive description of like elements and/or processes employed in respective embodiments is omitted for sake of brevity.

At 602, computer-implemented method 600 can comprise increasing (e.g., once or iteratively), by a system (e.g., via iterative quantum amplitude estimation system 102 and/or iterative quantum amplitude estimation component 108) operatively coupled to a processor (e.g., processor 106, a quantum processor, etc.), a multiplier value (denoted as q in FIG. 4) of a confidence interval (e.g., confidence interval 404a, 404b, 404c, 404d, 404e, 404f, etc.) in an estimation problem to a defined value (e.g., the largest multiplier value, desired value, target value, etc.) that positions the confidence interval (e.g., the entire confidence interval) in a defined plane (e.g., either the upper half plane or the lower half plane) of a defined circle (e.g., a unit circle such as, for instance, unit circle 402a, 402b, 402c, 402d, 402e, 402f, etc.).

At 604, computer-implemented method 600 can comprise capturing, by the system (e.g., via iterative quantum amplitude estimation system 102 and/or measurement component 110), a quantum state measurement of a qubit in a quantum circuit (e.g., a quantum computer, a quantum computing device, a quantum processor, a superconducting circuit, etc.) based on the defined value.

At 606, computer-implemented method 600 can comprise computing, by the system (e.g., via iterative quantum amplitude estimation system 102 and/or iterative quantum amplitude estimation component 108), one or more next values of the multiplier value based on an upper bound value and a lower bound value of a defined confidence interval (e.g., confidence interval 404a) to iteratively increase (e.g., via iterative quantum amplitude estimation component 108) the multiplier value of the confidence interval.

At 608, computer-implemented method 600 can comprise capturing, by the system (e.g., via iterative quantum amplitude estimation system 102 and/or measurement component 110), quantum state measurements of the qubit based on different multiplier values of the confidence interval (e.g., different multiplier values computed by iterative quantum amplitude estimation component 108 in implementing algorithm 300).

At 610, computer-implemented method 600 can comprise combining, by the system (e.g., via iterative quantum amplitude estimation system 102 and/or iterative quantum amplitude estimation component 108), the quantum state measurements to estimate a property of interest value (denoted herein and/or in the figures as a and/or $\mathbb{P}|1\rangle$) in the confidence interval.

At 612, computer-implemented method 600 can comprise generating, by the system (e.g., via iterative quantum amplitude estimation system 102 and/or iterative quantum amplitude estimation component 108), a proof (e.g., a proof that yields Theorem 1 described above) to support an estimation of the property of interest value.

At 614, computer-implemented method 600 can comprise estimating, by the system (e.g., via iterative quantum amplitude estimation system 102, iterative quantum amplitude estimation component 108, and/or measurement component 110), the property of interest value in the confidence interval based on the defined value, thereby facilitating at least one of improved application of a QAE algorithm, improved performance of the processor, or reduced computational costs of the processor.

Figure 7:
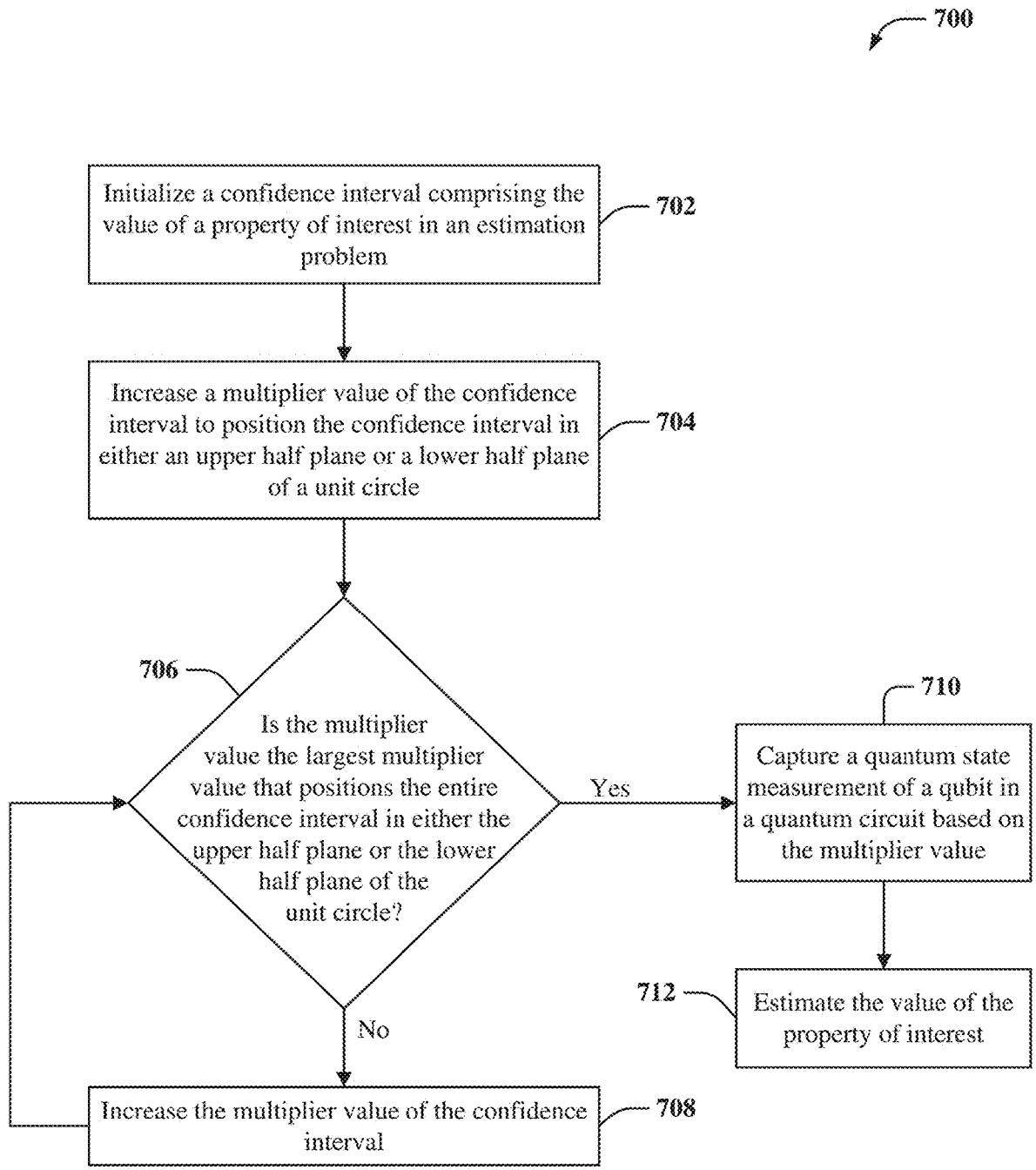

FIG. 7 illustrates a flow diagram of an example, non-limiting computer-implemented method 700 that can facilitate iterative quantum amplitude estimation in accordance with one or more embodiments described herein. Repetitive description of like elements and/or processes employed in respective embodiments is omitted for sake of brevity.

At 702, computer-implemented method 700 can comprise initializing (e.g., via iterative quantum amplitude estimation system 102 and/or iterative quantum amplitude estimation component 108) a confidence interval (e.g., confidence interval 404a illustrated in FIG. 4) comprising the value of a property of interest (e.g., a property of interest value denoted herein and/or in the figures as a and/or $\mathbb{P}|1\rangle$) in an estimation problem. For example, iterative quantum amplitude estimation component 108 can initialize confidence interval 404a illustrated in FIG. 4 by implementing (e.g., via processor 106) algorithm 200 (e.g., line 5 of algorithm 200).

At 704, computer-implemented method 700 can comprise increasing (e.g., via iterative quantum amplitude estimation system 102 and/or iterative quantum amplitude estimation component 108) a multiplier value of the confidence interval to position the confidence interval in either an upper half plane or a lower half plane of a unit circle. For example, as described above with reference to FIGS. 1-4, iterative quantum amplitude estimation component 108 can implement (e.g., via processor 106) algorithm 300 depicted in FIG. 3 to increase (e.g., once or iteratively) a multiplier value (denoted as q in FIG. 4) of a confidence interval (e.g., confidence interval 404a, 404b, 404c, 404d, 404e, 404f, etc.) to position the confidence interval in the upper half plane or the lower half plane of a defined circle (e.g., a unit circle such as, for instance, unit circle 402a, 402b, 402c, 402d, 402e, 402f, etc.).

At 706, computer-implemented method 700 can comprise determining (e.g., via iterative quantum amplitude estimation system 102 and/or iterative quantum amplitude estimation component 108) whether the multiplier value is the largest multiplier value that positions the entire confidence interval in either the upper half plane or the lower half plane of the defined circle. For example, as described above with reference to FIGS. 1-4, iterative quantum amplitude estimation component 108 can implement (e.g., via processor 106) algorithm 300 depicted in FIG. 3 to increase (e.g., once or iteratively) a multiplier value (denoted as q in FIG. 4) of a confidence interval (e.g., confidence interval 404a, 404b, 404c, 404d, 404e, 404f, etc.) to position the entire confidence interval in either the upper half plane or the lower half plane of a defined circle (e.g., a unit circle such as, for instance, unit circle 402a, 402b, 402c, 402d, 402e, 402f, etc.).

If it is determined at 704 that the multiplier value is not the largest multiplier value that positions the entire confidence interval in either the upper half plane or the lower half plane of the defined circle, at 708, computer-implemented method 700 can comprise increasing (e.g., via iterative quantum amplitude estimation system 102 and/or iterative quantum amplitude estimation component 108) the multiplier value of the confidence interval and repeating step 706 described above. For example, as described above with reference to FIGS. 1-4, iterative quantum amplitude estimation component 108 can implement (e.g., via processor 106) algorithm 300 depicted in FIG. 3 to increase (e.g., once or iteratively) a multiplier value (denoted as q in FIG. 4) of a confidence interval (e.g., confidence interval 404a, 404b, 404c, 404d, 404e, 404f, etc.) to position the entire confidence interval in either the upper half plane or the lower half plane of a defined circle (e.g., a unit circle such as, for instance, unit circle 402a, 402b, 402c, 402d, 402e, 402f, etc.).

If it is determined at 704 that the multiplier value is the largest multiplier value that positions the entire confidence interval in either the upper half plane or the lower half plane of the defined circle, at 710, computer-implemented method 700 can comprise capturing (e.g., via iterative quantum amplitude estimation system 102, iterative quantum amplitude estimation component 108, and/or measurement component 110) a quantum state measurement of a qubit in a quantum circuit (e.g., a quantum computer, a quantum computing device, a quantum processor, a superconducting circuit, etc.) based on the multiplier value. For example, as described above with reference to FIGS. 1-4, based on implementation (e.g., via processor 106) of algorithm 200 and 300 by iterative quantum amplitude estimation component 108, iterative quantum amplitude estimation system 102 can employ measurement component 110 (e.g., a VNA, an AWG, etc.) to perform the measuring function referenced in line 11 of algorithm 200. In this example, measurement component 110 can perform such measuring function based on (e.g., using) the multiplier value (e.g., the largest multiplier value that positions the entire confidence interval in either the upper half plane or the lower half plane of the defined circle).

At 712, computer-implemented method 700 can comprise estimating (e.g., via iterative quantum amplitude estimation system 102 and/or iterative quantum amplitude estimation component 108) the value of the property of interest. For example, iterative quantum amplitude estimation component 108 can implement (e.g., via processor 106) algorithm 200 (e.g., lines 11-22 of algorithm 200) to estimate the value of the property of interest.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 8:
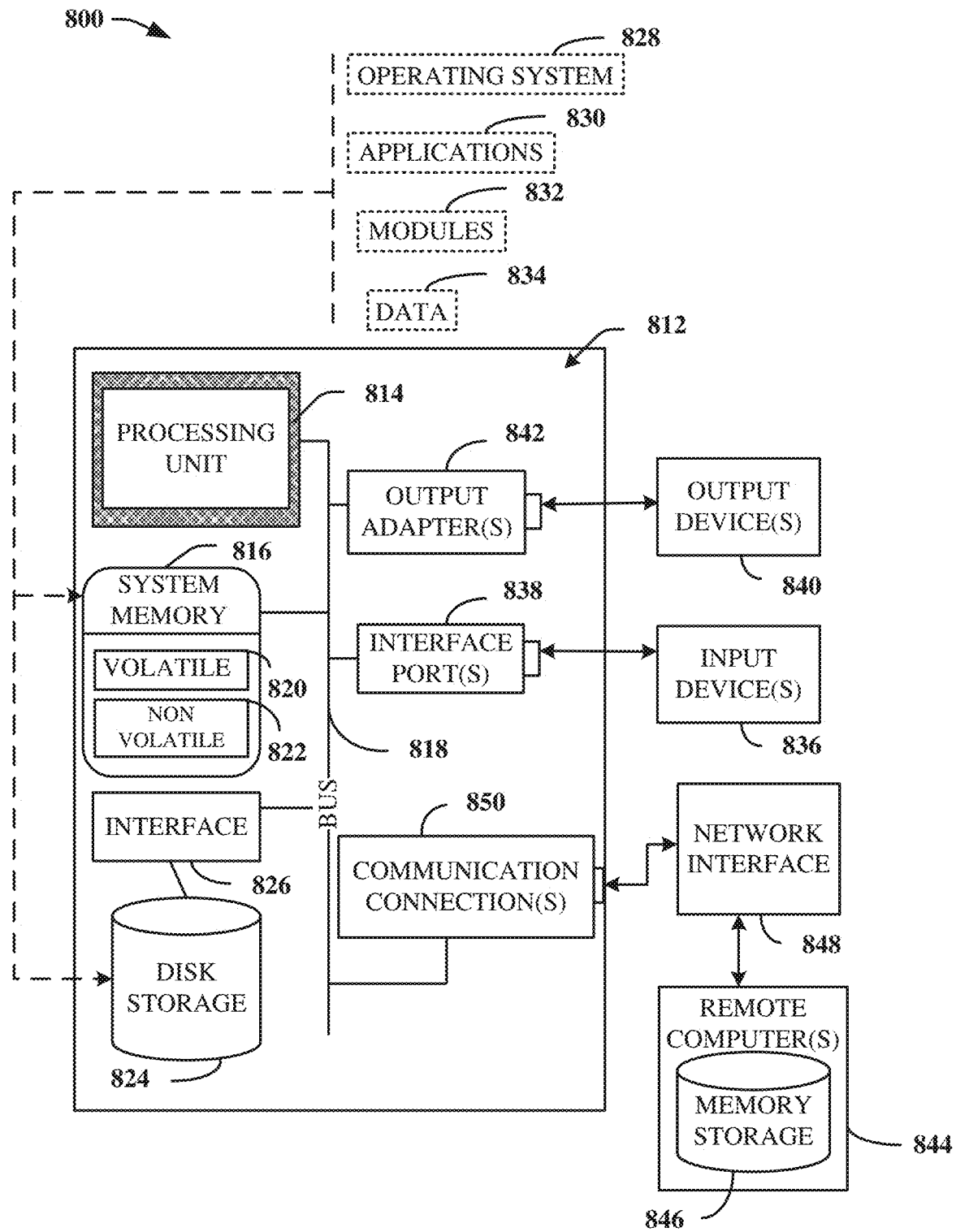
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection (s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Figure 9:
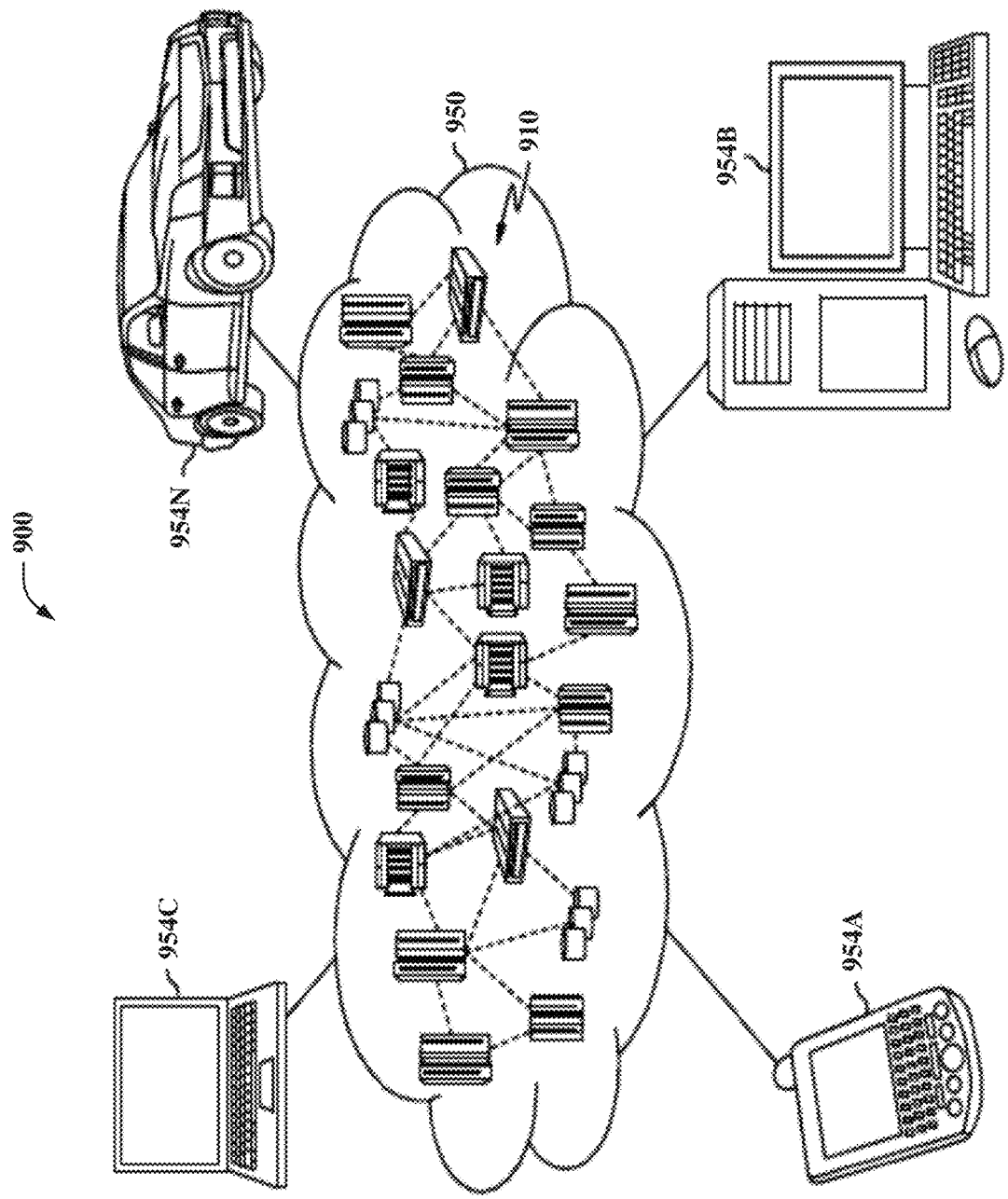
FIG. 9 illustrates a block diagram of an example, non-limiting cloud computing environment in accordance with one or more embodiments of the subject disclosure.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Although not illustrated in FIG. 9, cloud computing nodes 910 can further comprise a quantum platform (e.g., quantum computer, quantum hardware, quantum software, etc.) with which local computing devices used by cloud consumers can communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
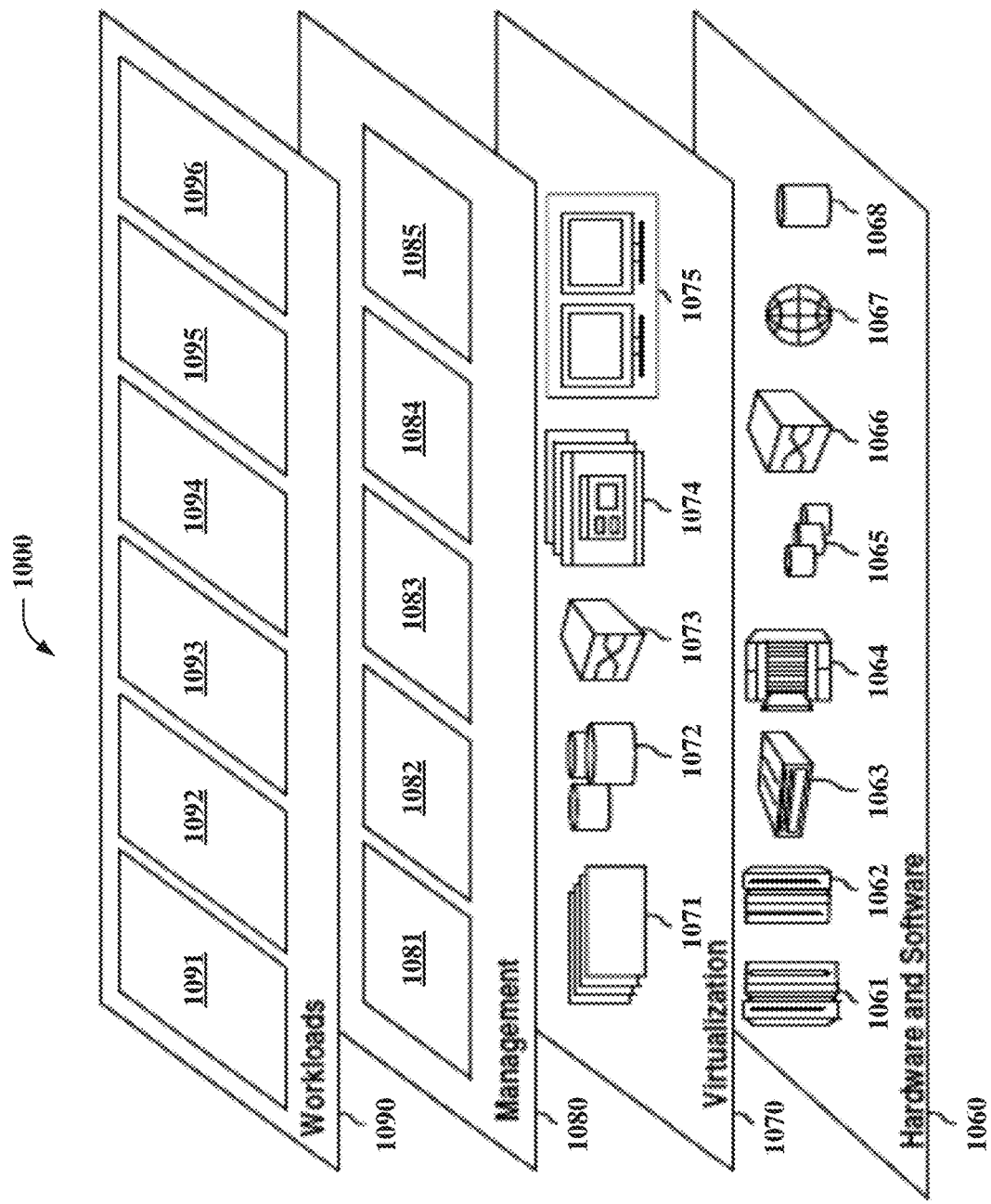
FIG. 10 illustrates a block diagram of example, non-limiting abstraction model layers in accordance with one or more embodiments of the subject disclosure.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067, database software 1068, quantum platform routing software (not illustrated in FIG. 10), and/or quantum software (not illustrated in FIG. 10).

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and iterative quantum amplitude estimation software 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, singlecore processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components;
   a quantum device that generates quantum states; and
   a processor that executes the computer executable components stored in the memory, wherein the computer executable components comprise:
   an iterative quantum amplitude estimation component that increases a multiplier value of a confidence interval in an estimation problem to a defined value that positions the confidence interval in a defined plane of a defined circle; and
   a measurement component that captures a quantum state measurement of a qubit in a quantum circuit based on the defined value.

2. The system of claim 1, wherein the defined circle comprises a unit circle, and wherein the defined plane of the defined circle comprises an upper half plane or a lower half plane of the defined circle.

3. The system of claim 1, wherein the confidence interval comprises an angle that corresponds to a probability of measuring a defined quantum state in a target qubit of the quantum circuit, and wherein the multiplier value of the confidence interval corresponds to a power value of a Grover operator in the estimation problem.

4. The system of claim 1, wherein the iterative quantum amplitude estimation component computes one or more next values of the multiplier value based on an upper bound value and a lower bound value of a defined confidence interval to iteratively increase the multiplier value of the confidence interval.

5. The system of claim 1, wherein:
   the measurement component captures quantum state measurements of the qubit based on different multiplier values of the confidence interval; and
   the iterative quantum amplitude estimation component combines the quantum state measurements to estimate a property of interest value in the confidence interval.

6. The system of claim 1, wherein the iterative quantum amplitude estimation component generates a proof to support an estimation of a property of interest value in the confidence interval.

7. The system of claim 1, wherein the iterative quantum amplitude estimation component estimates a property of interest value in the confidence interval based on the defined value, thereby facilitating at least one of improved application of a quantum amplitude estimation algorithm, improved performance of the processor, or reduced computational costs of the processor.

8. A computer-implemented method, comprising:
   increasing, by a system operatively coupled to a processor, a multiplier value of a confidence interval in an estimation problem to a defined value that positions the confidence interval in a defined plane of a defined circle; and
   capturing, by the system, a quantum state measurement of a qubit in a quantum circuit based on the defined value.

9. The computer-implemented method of claim 8, wherein the defined circle comprises a unit circle, and wherein the defined plane of the defined circle comprises an upper half plane or a lower half plane of the defined circle.

10. The computer-implemented method of claim 8, wherein the confidence interval comprises an angle that corresponds to a probability of measuring a defined quantum state in a target qubit of the quantum circuit, and wherein the multiplier value of the confidence interval corresponds to a power value of a Grover operator in the estimation problem.

11. The computer-implemented method of claim 8, further comprising:
computing, by the system, one or more next values of the multiplier value based on an upper bound value and a lower bound value of a defined confidence interval to iteratively increase the multiplier value of the confidence interval.

12. The computer-implemented method of claim 8, further comprising:
capturing, by the system, quantum state measurements of the qubit based on different multiplier values of the confidence interval; and
combining, by the system, the quantum state measurements to estimate a property of interest value in the confidence interval.

13. The computer-implemented method of claim 8, further comprising:
generating, by the system, a proof to support an estimation of a property of interest value in the confidence interval.

14. The computer-implemented method of claim 8, further comprising:
estimating, by the system, a property of interest value in the confidence interval based on the defined value, thereby facilitating at least one of improved application of a quantum amplitude estimation algorithm, improved performance of the processor, or reduced computational costs of the processor.

15. A computer program product facilitating an iterative quantum amplitude estimation process, the computer program product comprising a non-transitory computer readable storage medium having program instructions embodied therewith, the program instructions executable by a processor to cause the processor to:
increase, by the processor, a multiplier value of a confidence interval in an estimation problem to a defined value that positions the confidence interval in a defined plane of a defined circle; and
capture, by the processor, a quantum state measurement of a qubit in a quantum circuit based on the defined value.

16. The computer program product of claim 15, wherein the defined circle comprises a unit circle, and wherein the defined plane of the defined circle comprises an upper half plane or a lower half plane of the defined circle.

17. The computer program product of claim 15, wherein the program instructions are further executable by the processor to cause the processor to:
compute, by the processor, one or more next values of the multiplier value based on an upper bound value and a lower bound value of a defined confidence interval to iteratively increase the multiplier value of the confidence interval.

18. The computer program product of claim 15, wherein the program instructions are further executable by the processor to cause the processor to:
capture, by the processor, quantum state measurements of the qubit based on different multiplier values of the confidence interval; and
combine, by the processor, the quantum state measurements to estimate a property of interest value in the confidence interval.

19. The computer program product of claim 15, wherein the program instructions are further executable by the processor to cause the processor to:
generate, by the processor, a proof to support an estimation of a property of interest value in the confidence interval.

20. The computer program product of claim 15, wherein the program instructions are further executable by the processor to cause the processor to:
estimate, by the processor, a property of interest value in the confidence interval based on the defined value, thereby facilitating at least one of improved application of a quantum amplitude estimation algorithm, improved performance of the processor, or reduced computational costs of the processor.

* * * * *